Sept. 6, 1966 J. P. GLASS 3,271,204

LAMINATED CORES

Filed Nov. 29, 1957 2 Sheets-Sheet 1

INVENTOR.
John P. Glass,
BY
Paul & Paul
ATTORNEYS.

Sept. 6, 1966 J. P. GLASS 3,271,204

LAMINATED CORES

Filed Nov. 29, 1957 2 Sheets-Sheet 2

INVENTOR.
John P. Glass

BY Paul & Paul
ATTORNEYS.

United States Patent Office 3,271,204
Patented Sept. 6, 1966

3,271,204
LAMINATED CORES

John P. Glass, Ardmore, Pa., assignor to Litton Industries, Inc., Beverly Hills, Calif., a corporation of Delaware
Filed Nov. 29, 1957, Ser. No. 699,563
28 Claims. (Cl. 148—120)

This invention relates to improvements in the magnetic properties of laminated cores of inductive devices such as high fidelity transformers, meter transformers, synchro resolvers and other devices requiring a magnetic core having a permeability curve which is as linear as possible in order to avoid faulty response due to harmonics, distortion and the like.

As is well known, the permeability curve of many magnetic materials can be altered by stress. In particular, the permeability curve of the alloys of nickel and iron which are commonly used in many inductive devices can be altered by stress and the permeability over certain ranges of intensity of magnetizing force can be greatly increased by the application of tension stress.

The object of this invention is not particularly to increase the permeability of laminated cores but is rather to increase permeability at low values of magnetizing force and decrease it at somewhat higher values of magnetizing force in such way as to make the permeability curve much more linear over the working range of the inductive device. In many of the devices of the class in question, high permeability, per se, is desirable but is of relatively little importance compared to the necessity of holding down distortion due to the non-linearity of the permeability curve.

It is another object of this invention to make the transformation ratio of a synchro resolver more nearly uniform over a wide range of excitation voltages.

It is another object to reduce the stray voltages in synchros when the synchro is positioned at its null.

It is another object to reduce the sensitiveness of devices such as synchros to the stresses of manufacture. It is another object to provide that the lamination of the core lie tightly and snugly together.

The objects of this invention are accomplished by brinelling selected areas of the laminations which make up the core of the transformer, or the rotor or stator of the synchro. This brinelling is an operation whereby portions of the lamination are dimpled by being subjected to compressive forces which compress a local area in the annealed lamination and cause the metal to flow, and thereby subject the area of the lamination surrounding the compressed or dimpled portion to tension stress. The portion of the lamination which is under the highest tension has the highest permeability at lower magnetizing forces, and the portion of the lamination which is most severely deformed by the compressive force applied to it under the brinelling tools is physically much harder than before and magnetically less permeable in the higher ranges of magnetizing force. By controlling and selecting the relative compressive and tension areas of lamination and the amount of stretching under the brinelling tools, the desired result of making the permeability curve more linear is obtained.

Other objects and advantages of this invention will further become apparent hereinafter and in the drawings, in which.

Figure 1:
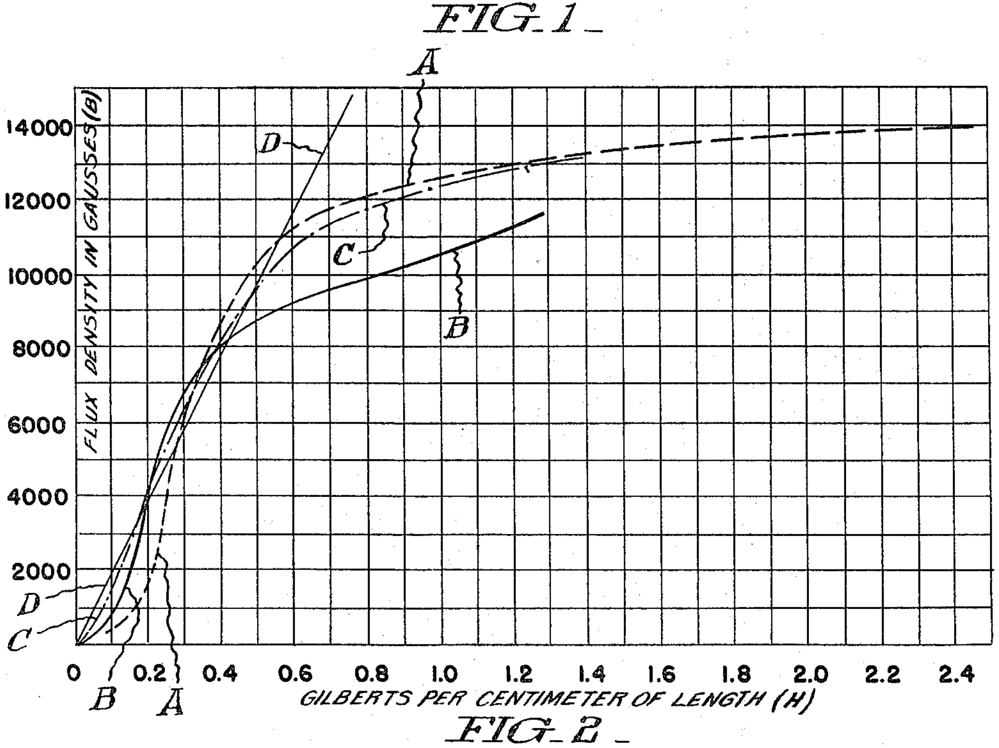
FIG. 1 is a graph showing a number of permeability or magnetization curves.

Although specific terms are used in the following description for clarity, these terms are intended to refer only to the structure shown in the drawings and are not intended to define or limit the scope of the invention.

FIG. 1 shows a number of permeability curves, with magnetizing force in gilberts per centimeter of length (H) being plotted against flux density in lines per square centimeter (gauss, B). Curve A is the permeability curve of a ring shaped lamination of a synchro, which lamination is composed of 50% nickel and 50% iron. This lamination was annealed at 1700° F., a low annealing temperature for this material. This temperature is chosen in order to reduce the sensitiveness of the lamination to the stresses which it encounters in the further fabrication of the product, a synchro.

After curve A was plotted, the lamination was subjected to local and servere brinelling of its inner edge. Tests of thus brinelled lamination produce a curve B. Note the improved permeability in the lower range of magnetizing force, i.e. below 0.2 gilbert per centimeter of length. Although the lower portion of permeability curve B is thus improved and brought closer to the desired linearity, the upper portion of the curve suffers a loss. This is because not all of the lamination was brought into tension, and because the brinelling penetrated too deeply into the radial depth of the lamination, causing excessive loss of permeability in the upper range of magnetizing force. By avoiding brinelling too deeply and by placing all of the lamination in tension except the portion which is in compression from the brinelling, curve C is obtained which more nearly approaches the ideal permeability curve indicated by the line D.

Figure 3:
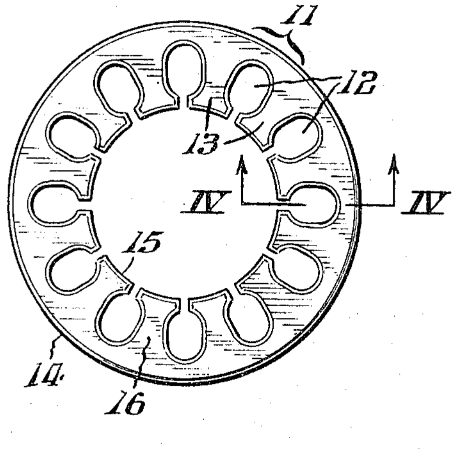
FIG. 3 is a view in plan of a synchro lamination constructed in accordance with this invention.
Figure 4:
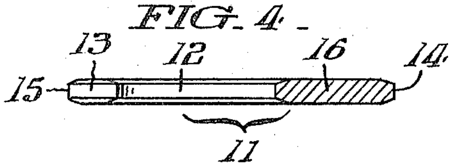
FIG. 4 is a sectional view taken as indicated by the lines and arrows IV—IV which appear in FIG. 3.
Figure 5:
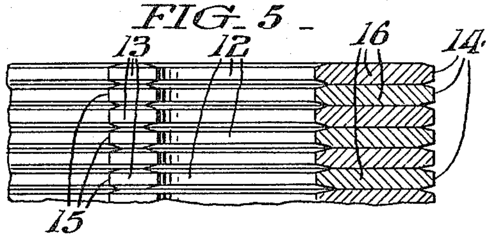
FIG. 5 is a view similar to FIG. 4 and shows a number of laminations to illustrate how they are stacked.

Turning now to the specific embodiments of the invention selected for illustration in the drawings and referring more particularly to the embodiment of FIGS. 3–5, the number 11 designates generally a synchro lamination having a number of slots 12 and a number of teeth 13. The outside border 14 of lamination 11 is under compression stress from brinelling, coining, or other operation. Similarly the inside border 15 of lamination 11 is under compression stress. Accordingly, the remaining area 16 of lamination 11 is under tension stress.

Figure 6:
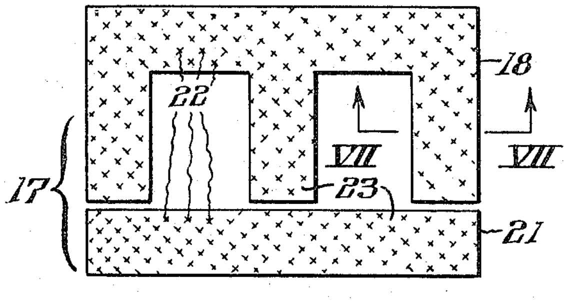
FIG. 6 is a view in plan of a lamination of another configuration.
Figures 7, 8:
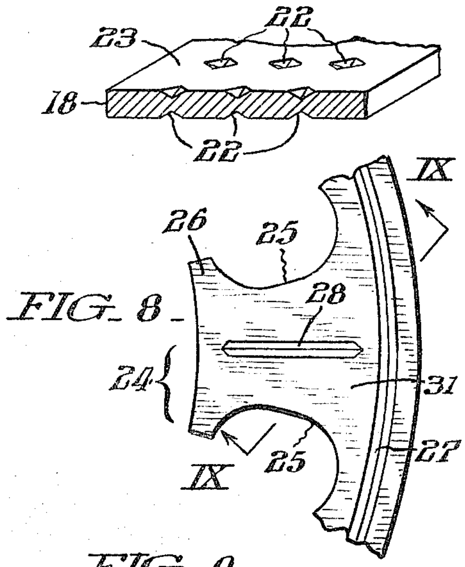
FIG. 7 is a view in section taken as indicated by the lines and arrows VII—VII which appear in FIG. 6.
FIG. 8 is an enlarged fragmentary plan view of another lamination.

Referring to FIGS. 6 and 7, there is shown another embodiment of the invention which comprises a laminations 17 having an E-shaped section 18 and a rectangularly shaped section 21. Selected portions of the lamination 17 have been subjected to compression by brinelling or coining or other means, and this operation has produced the dimples 22. The area of the dimples in under compression stress, while the surrounding area 23 is under tension stress.

Figure 9:
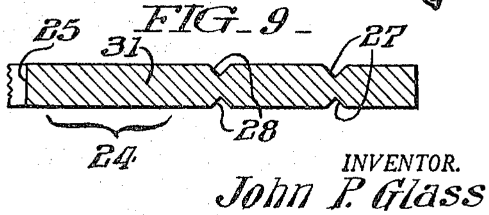
FIG. 9 is a view in section taken as indicated by the lines and arrows IX—IX which appear in FIG. 8.

Referring to FIGS. 8 and 9, there is shown another embodiment of the invention which includes a lamination 24 which is ring-shaped and which is provided with slots 25 and teeth 26. Here again selected areas of the lamination 24 have been subjected to brinelling, coining or other compressive operation, to place sections 27 and 28 under compression stress, and to place the surrounding area 21 under tension stress.

Figure 10:
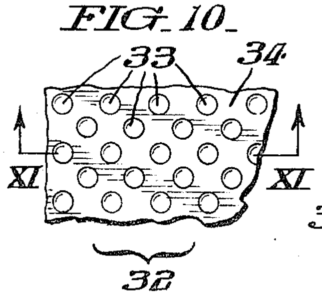
FIG. 10 is a fragmentary plan view of another lamination.
Figure 11:
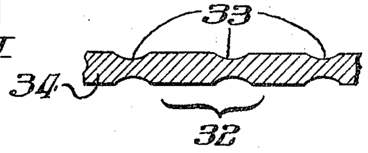
FIG. 11 is a view in section taken as indicated by the lines and arrows XI—XI which appear in FIG. 10.

Referring to FIGS. 10 and 11, there is shown another embodiment of the invention which includes a lamination 32 having compressive dimples 33 and tension stress areas 34 which surround dimples 33.

The process of manufacturing these laminations includes the step of taking an annealed ferromagnetic lamination and introducing into selected areas of that lamination compressive deformation, thereby subjecting these selected areas to compression stress and subjecting the remaining areas of the lamination to tension stress. This stress inducing operation is accomplished by a number of means including brinelling, which is here defined as applying a number of balls to the surface of the lamination and aplying force to the balls to dimple the lamination. This stress inducing operation is also accomplished by coining, or by carefully controlled shot blasting, or by sandblasting. Another method of accomplishing the same result is to introduce surface stress in the lamination by chemical treatment, such as by nitriding. Such treatment produces compressive stress in the surface but does not penetrate deeply enough to place the interior of the lamination in compressive stress. Instead the interior is placed in tension stress.

While the processes of brinelling, coining, shot blasting, sandblasting, and nitriding are old, to apply such processes to the manufacture of improved laminations is a new use.

Figure 2:
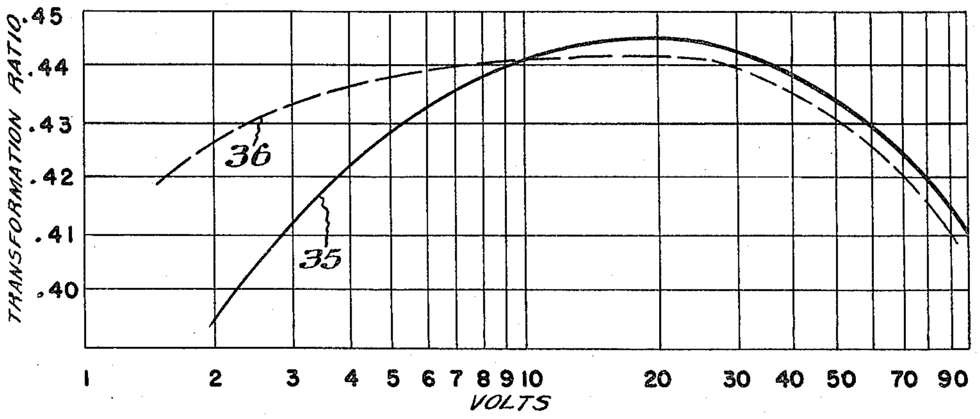
FIG. 2 is a graph showing the transformation ratio of a synchro resolver plotted against the excitation voltage.

The advantages of the invention are manifold. For example, in FIG. 2 is shown the transformation ratio of a synchro resolver plotted against the excitation voltage. The specific resolver involved is a miniature resolver having a small air gap and the variations in the permeability of its core as the excitation voltage is increased affect the transformation ratio according to curve 35. By treating the laminations in accordance with this invention, curve 36 is achieved. Since the resolver is used to compute the sine and cosine of the exciting voltages, improving the transformation ratio by flattening the curve over the working range of the synchro is such an improvement that it makes other compensations for error unnecessary. The working range of the synchro is approximately 2 to 26 volts. This improvement of the operation of the synchro resolver is comparable to a similar improvement obtained by applying the invention to a high fidelity transformer in which a wide dynamic response range is required. Similar results are obtained in instrument transformers to eliminate the errors which normally occur at the low range of the transformer.

Another advantage of this invention is to reduce the voltage of the nulls in synchros. In a typical synchro system comprising a transmitter and a control transformer, the maximum output of the control transformer is about 20 volts and the third harmonic content of this 20 volts is about 200 millivolts, roughly 1%. Since the control transformer is driven in the servo system to its null position, theoretically there is no output from the control transformer. Unfortunately in practice this is not the case, since generally speaking there is a residual voltage of .1% of the maximum voltage which remains even at the best null position. This residual null voltage is composed of several components and is due to divers causes, but often a substantial portion of it is the third harmonic above mentioned, and this third harmonic voltage is caused by the non-linearity of the magnetization of the iron cores (the non-linearity of the permeability curve). If the null position for the third harmonic coincided with that for the fundamental frequency, there would be little difficulty with it. But again unfortunately, due to unavoidable conditions of manufacture, the third harmonic null is generally displaced from the fundamental null so that it is not possible to thus avoid this "noise" voltage. However, by means of this invention the third harmonic content is substantially reduced with corresponding improvement at the null.

Another important consequence resulting from treating laminations for synchros in accordance with this invention is the reduction in sensitiveness of the laminations to the additional stresses of manufacture. This makes possible a higher annealing temperature and a corresponding improvement at a low magnetization force. The fact that the lamination is already under severe stresses after being subjected to brinelling, coining or other compressive methods, is of advantage since any additional stresses introduced in winding the cores and in assembling the unit will have a lesser relative effect and the synchros are much more accurate in the angular sense.

Another advantage of one form of the invention, wherein the brinelling takes the form of forging a rounded edge on the previously annealed lamination, is the reduction of trouble from burrs which arise from the punching operation used to produce the laminations. These burrs have several very undesirable effects: they keep the laminations from lying tightly and snugly together so that they occupy more space, or bend, or otherwise introduce unexpected and unpredictable stresses. Further these rounded edges tend to eliminate the shorting together of the edges of the laminations when the bore and outside diameter are grounded.

It is to be understood that the form of the invention herewith shown and described is to be taken as a preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

Having thus described my invention, I claim:

1. A method of forming an electrical inductive device, comprising brinelling selected areas of an annealed ferromagnetic lamination in order to introduce tension stress into the bulk of the lamination to improve the magnetization curve of said device over its operating range and to suppress third harmonics, and to increase permeability at low values of magnetizing force and decrease it at somewhat higher values of magnetizing force so as to impart to said lamination a permeability curve which is more linear than a similar lamination which has not been so treated, and assembling a plurality of treated laminations in an inductive device.

2. A method of forming an electrical inductive device, comprising coining selected areas of an annealed ferromagnetic lamination in order to introduce tension stress into the bulk of the lamination to improve the magnetization curve of said device over its operating range and to suppress third harmonics so as to impart to said lamination a permeability curve which is more linear than a similar lamination which has not been so treated, and assembling a plurality of the treated laminations in an inductive device.

3. A method of forming an electrical inductive device, comprising nitriding an annealed ferromagnetic lamination in order to introduce tension stress into the bulk of the lamiation to improve the magnetization curve of said device over its operating range and to suppress third harmonics so as to impart to said lamination a permeability curve which is more linear than a similar lamination which has not been so treated, and assembling a plurality of the treated laminations in an inductive device.

4. A method of forming an electrical inductive device, comprising stressing selected areas of an annealed ferromagnetic lamination to introduce tension stress into the bulk of the lamination sufficiently to raise the lower knee and to lower the upper knee of the permeability curve of said lamination to make said permeability curve more linear, and assembling a plurality of the treated laminations in an inductive device.

5. In an electromagnetic device, an annealed ferromagnetic lamination having selected portions which are under compressive stress and other selected portions which are under tension stress, and having a permeability curve which is more linear than an annealed ferromagnetic lamination without said selected portions under compressive stress and said selected portions under tension stress.

6. In an electromagnetic device, an annealed ferromagnetic lamination having its surface only under compressive stress balanced by tension stress in the interior of the lamination, and having a permeability curve which is more linear than an annealed ferromagnetic lamination which does not have its surface only under compressive stress and which does not have the compressive stress balanced by tension stress in the interior of the lamination.

7. In an electromagnetic device such as a synchro, a magnetic core formed of annealed ferromagnetic laminations of flat, ring-shaped steel, each of said laminations having an outer edge and having an inner edge formed of slots and teeth, said outer and inner edges being under compressive stress to form beveled borders and the remainder of each lamination being under tension stress to improve the magnetization curve of the electromagnetic device over its operating range, and having a permeability curve which is more linear than the permeability curve of an annealed ferromagnetic lamination which does not have its edges under compressive stress and which does not have the remainder of the lamination under tension stress.

8. A process of introducing tension stress into selected areas of an annealed ferromagnetic lamination of an electromagnetic device by compressively deforming other selected areas of the lamination so as to impart to said lamination a permeability curve which is more linear than a similar lamination which has not been so treated.

9. A process of introducing tension stress into selected areas of an annealed ferromagnetic lamination of an electromagnetic device by carefully controlled shot blasting of other selected areas of the lamination so as to impart to said lamination a permeability curve which is more linear than a similar lamination which has not been so treated.

10. A process of introducing tension stress into selected areas of an annealed ferromagnetic lamination of an electromagnetic device by carefully controlled sandblasting of other selected areas of the lamination so as to impart to said lamination a permeability curve which is more linear than a similar lamination which has not been so treated.

11. A process of introducing tension stress into selected areas of an annealed ferromagnetic lamination of an electromagnetic device by compressively deforming other selected areas by nitriding so as to impart to said lamination a permeability curve which is more linear than a similar lamination which has not been so treated.

12. A process of introducing tension stress into selected areas of an annealed ferromagnetic lamination of an electromagnetic device by brinelling other selected areas of the lamination so as to impart to said lamination a permeability curve which is more linear than a similar lamination whch has not been so treated.

13. A process of introducing tension stress into selected areas of an annealed ferromagnetic lamination of an electromagnetic device by coining other selected areas of the lamination to increase permeability at low values of magnetizing force and decrease it at somewhat higher values of magnetizing force so as to impart to said lamination a permeability curve which is more linear than a similar lamination which has not been so treated.

14. A new use of the process of brinelling, comprising the step of brinelling selected areas of the annealed ferromagnetic laminations of an electromagnetic device such as a synchro in order to introduce tension stress into the bulk of the lamination to improve the magnetization curve of the synchro over its operating range and to suppress third harmonics so as to impart to said lamination a permeability curve which is more linear than a similar lamination which has not been so treated.

15. A new use of the process of coining, comprising the step of coining selected areas of the annealed ferromagnetic laminations of an electromagnetic device such as a synchro in order to introduce tension stress into the bulk of the lamination to improve the magnetization curve of the synchro over its operating range and to suppress third harmonics so as to impart to said lamination a permeability curve which is more linear than a similar lamination which has not been so treated.

16. A new use of the process of nitriding, comprising the step of nitriding selected areas of the annealed ferromagnetic laminations of an electromagnetic device such as a synchro in order to introduce tension stress into the bulk of the lamination to improve the magnetization curve of the synchro over its operating range and to suppress third harmonics so as to impart to said lamination a permeability curve which is more linear than a similar lamination which has not been so treated.

17. An improved electrical inductive device comprising a plurality of treated annealed ferromagnetic laminations, each of said laminations having a more linear permeability curve than non-treated laminations.

18. A process of treating a ferromagnetic lamination comprising compressively deforming predetermined portions of the edge of said lamination beyond the elastic limit to introduce tension stress into the bulk of the lamination and make the permeability curve of said lamination more linear.

19. A method of improving the magnetization curve of an electrical inductive device comprising compressively deforming predetermined portions of a ferromagnetic lamination composed of 50 percent nickel and 50 percent iron adapted for use in the lamination stack of said electrical inductive device to introduce tension stress into the bulk of the lamination, lowering the permeability curve of said lamination from about 10,300 to 9,400 gausses at about 0.5 gilbert per centimeter of length, and raising the permeability curve from about 400 to 1500 gausses at 0.1 gilbert per centimeter of length, to make the permeability curve of said lamination more linear.

20. A process of treating a ferromagnetic lamination for inductive uses which comprises ascertaining the permeability curve of said lamination, and stressing portions of said lamination sufficiently to make said permeability curve more linear.

21. A ferromagnetic lamination for inductive uses comprising a body of magnetic material adapted to be located in inductive apparatus so that lines of magnetic force will flow therein, a portion of the surface of said material being compressively deformed to introduce tension stress into the bulk of the material and make the permeability curve of said lamination more linear.

22. In an electromagnetic device, a ferromagnetic lamination having regions of increased magnetic reluctance under compressive stress, other regions of decreased magnetic reluctance under tension stress, and a permeability curve which is more linear than said lamination without said regions.

23. In the method of improving the magnetization curve of a ferromagnetic lamination, in combination, compressing portions of the surface of said lamination to introduce compression and tension stress in the lamination to give a lamination in which portions are under compression and the bulk is under tension to effectively raise the lower knee and lower the upper knee of the permeability curve of said lamination to make it more linear.

24. In a method of making a lamination useful in a synchro, the steps comprising taking a first ring-shaped lamination composed of 50% nickel and 50% iron, annealing said first lamination at 1700° F., ascertaining the permeability curve of said lamination, subjecting said lamination to local and severe brinelling of its inner edge, again ascertaining the permeability curve of said lamination, taking a second annealed lamination, subjecting said second lamination to a less severe brinelling than said first lamination, and ascertaining the permeability curve of said second lamination, whereby said last permeability curve is more linear than the first and second said permeability curves.

25. In a method of making a lamination useful in a synchro, the steps comprising taking a first ferromagnetic lamination, annealing said first lamination, ascertaining the permeability curve of said lamination, subjecting said lamination to local and severe brinelling of its inner edge, again ascertaining the permeability curve of said lamination, taking a second annealed lamination, subjecting said second lamination to a less severe brinelling than said first lamination, and ascertaining the permeability curve of said second lamination, whereby said last permeability curve is more linear than said first and second permeability curves.

26. A method of improving the magnetization curve of an electrical inductive device comprising stressing selected areas of a ferromagnetic lamination composed of 50 percent nickel and 50 percent iron, which areas are spaced from each other throughout the lamination, so as to raise the flux density at 0.2 gilbert per centimeter of length from 1700 gausses to 4100 gausses and to lower the flux density at 0.5 gilbert per centimeter of length from 10,300 gausses to 9,400 gausses, to make the permeability curve of said lamination more linear.

27. A method of improving the magnetization curve of an eletcrical inductive device comprising compressing selected areas of a ferromagnetic lamination composed of 50 percent nickel and 50 percent iron, which areas are spaced from each other throughout the lamination, so as to raise the lower knee of its permeability curve by 2400 gausses at 0.2 gilbert per centimeter of length, and to lower the upper knee of its permeability curve by 900 gausses at 0.5 gilbert per centimeter of length, to make the permeability curve of said lamination more linear.

28. In a method of making a lamination useful in a synchro, the steps comprising taking a ring-shaped lamination composed of 50% nickel and 50% iron, annealing said lamination at 1700° F., compressing selected areas of said lamination, which areas are spaced from each other throughout the lamination, so as to raise the lower knee of its permeability curve at 0.2 gilbert per centimeter of length to 4100 gausses, and to lower the upper knee of its permeability curve to 9,400 gausses at 0.5 gilbert per centimeter of length, to make the permeability curve of said lamination more linear.

References Cited by the Examiner

UNITED STATES PATENTS

| | | | |
|---|---|---|---|
| 1,313,054 | 8/1919 | Berry | 29—155.61 |
| 1,586,877 | 6/1926 | Buckley | 336—68 |
| 2,234,968 | 3/1941 | Hayes et al. | 29—155.61 |
| 2,271,040 | 1/1942 | Snoek | 148—120 |
| 2,282,163 | 5/1942 | Burgwin | 148—6.35 |
| 2,552,109 | 5/1951 | Nahman | 336—234 |
| 2,565,303 | 8/1951 | Garbarino | 29—155.61 |
| 2,584,564 | 2/1952 | Ellis | 29—155.61 |
| 2,765,161 | 10/1956 | Mungall | 184—21.55 |
| 2,920,296 | 1/1960 | Neurath | 29—155.61 |

OTHER REFERENCES

"Metals Handbook," American Society for Metals, 1948 ed., p. 701.

DAVID L. RECK, *Primary Examiner.*

CLAUDE A. LEROY, RAY K. WINDHAM, MARCUS U. LYONS, ROGER L. CAMPBELL, *Examiners.*

J. L. BOHAN, J. P. RYTHER, G. HALL, O. MARJAMA, *Assistant Examiners.*